United States Patent
Jensen et al.

(10) Patent No.: US 8,681,218 B1
(45) Date of Patent: Mar. 25, 2014

(54) SYSTEM FOR PROVIDING SPATIAL AWARENESS OF TRANSMISSIONS OF ENERGY IN AN ENVIRONMENT

(75) Inventors: Dana J. Jensen, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1426 days.

(21) Appl. No.: 12/217,411

(22) Filed: Jul. 3, 2008

(51) Int. Cl.
*H04N 7/18* (2006.01)

(52) U.S. Cl.
USPC .......... 348/143; 348/135; 348/152; 342/25 A; 342/55; 342/118

(58) Field of Classification Search
USPC ........... 348/81, 115–119, 135–137, 143, 152; 342/14–15, 25 R, 25 A, 32–33, 37, 55, 342/63–66, 118, 176, 191
See application file for complete search history.

(56) References Cited

U.S. PATENT DOCUMENTS

| | | | | |
|---|---|---|---|---|
| 3,870,993 | A * | 3/1975 | Biagi et al. | 342/47 |
| 3,879,732 | A * | 4/1975 | Simpson | 342/14 |
| 3,947,846 | A * | 3/1976 | Carnahan et al. | 342/16 |
| 4,509,151 | A * | 4/1985 | Anderson | 367/118 |
| 4,686,532 | A * | 8/1987 | McAulay | 342/195 |
| 4,720,712 | A * | 1/1988 | Brookner et al. | 342/383 |
| 4,816,832 | A * | 3/1989 | Gold et al. | 342/14 |
| 4,855,747 | A * | 8/1989 | Steinberg | 342/179 |
| 4,896,159 | A * | 1/1990 | Sabatini et al. | 342/131 |
| 4,901,084 | A * | 2/1990 | Huguenin et al. | 342/179 |
| 5,012,251 | A * | 4/1991 | Kennedy et al. | 342/176 |
| 5,280,344 | A * | 1/1994 | Witlin et al. | 348/708 |
| 5,307,077 | A | 4/1994 | Branigan | |
| 5,373,773 | A * | 12/1994 | Groves | 89/1.11 |
| 5,465,142 | A * | 11/1995 | Krumes et al. | 356/5.01 |
| 5,680,141 | A * | 10/1997 | Didomenico et al. | 342/372 |
| 5,719,498 | A * | 2/1998 | Hausmann | 324/309 |
| 5,971,580 | A * | 10/1999 | Hall et al. | 700/83 |
| 6,052,335 | A * | 4/2000 | Korolenko | 367/121 |
| 6,075,442 | A * | 6/2000 | Welch | 340/573.1 |
| 6,580,392 | B2 * | 6/2003 | Yu | 342/378 |
| 6,661,378 | B2 | 12/2003 | Bloy | |
| 7,088,956 | B2 * | 8/2006 | Kishigami et al. | 455/65 |
| 7,205,933 | B1 * | 4/2007 | Snodgrass | 342/148 |

(Continued)

OTHER PUBLICATIONS

Daimler-Benz Aerospace, "Multifunction 35 GHz FMCW radar with frequency scanning antenna for synthetic vision applications", 1995, retrieved from <http://scitation.aip.org/getpdf/serylet/GetPDFSerylet?filetype=pdf&id=PSISDG002463000001000028000001&idtype=cvips& doi=10.1117/12.212752&prog=normal>.*

(Continued)

*Primary Examiner* — David Lazaro
*Assistant Examiner* — Sarah Drabik
(74) *Attorney, Agent, or Firm* — Donna P. Suchy; Daniel M. Barbieri

(57) ABSTRACT

A system for providing RF spatial awareness of an environment includes an RF detection system and a control system. The RF detection system includes an antenna array for receiving RF signals from a plurality of RF sources; and, a receiver system operatively connected to the antenna array using digital beamforming (DBF) techniques for processing the received RF signals and providing measurements of the RF signals as output. The control system receives the measurements of the RF signals and displays a plurality of indicia indicating the RF sources, thereby providing a visual survey of the environment.

18 Claims, 2 Drawing Sheets

(56) References Cited

U.S. PATENT DOCUMENTS

| | | | | |
|---|---|---|---|---|
| 7,401,030 | B1* | 7/2008 | Mather et al. | 705/7.11 |
| 7,650,135 | B2* | 1/2010 | Twitchell | 455/343.3 |
| 7,675,461 | B1* | 3/2010 | McCusker et al. | 342/179 |
| 2001/0049295 | A1* | 12/2001 | Matsuoka et al. | 455/562 |
| 2003/0151541 | A1 | 8/2003 | Oswald | |
| 2003/0236077 | A1* | 12/2003 | Sivard | 455/127.1 |
| 2006/0050929 | A1* | 3/2006 | Rast et al. | 382/103 |
| 2006/0139162 | A1* | 6/2006 | Flynn | 340/521 |
| 2007/0174770 | A1* | 7/2007 | Safoutin | 715/700 |
| 2009/0315777 | A1* | 12/2009 | Baughman | 342/457 |

OTHER PUBLICATIONS

Rehnmark et al., "Passive, precision direction finding", Aug. 1990, <http://www.highbeam.com/doc/1G1-9323293.html>.*

Daimler-Benz Aerospace, "Multifunction 35 GHz FMCW radar with frequency scanning antenna for synthetic vision applications", 1995, retrieved from <http://scitation.aip.org/getpdf/serylet/GetPDFServlet?filetype=pdf&id=PSISDG002463000001000028000001&idtype=cvips& doi=10.1117/12.212752&prog=normal>.*

Valentino, "Digital Beamforming: New Technology for Tomorrow's Radars", Defense Electronics, Oct. 1984.*

Amar et al., "On Unique Passive Geolocation of Multiple Radio-Frequency Emitters", 2005, <http://ieeexplore.ieee.org/stamp/stamp.jsp?tp=&arnumber=1581087&userType=inst>.*

Haynes, "A Primer on Digital Beamforming", Mar. 1998, <http://www.google.com/url?sa=t&rct=j&q=a%20primer%20on%20digital%20beamforming&source=web&cd=1&ved=0CEcQFjAA&url=http%3A%2F%2Fwww.spectrumsignal.com%2Fpublications%2Fbeamform_primer.pdf&ei=QO8jUK6SIcrI0QG-8YHICQ&usg=AFQjCNGNYxf56cN46xK8g5M7ksLLKFXHNg>.*

Atkinson, "Lockheed Martin Unveils Passive Detection System", Oct. 1998, <http://www.highbeam.com/doc/1G1-53109835.html>.*

Rehnmark et al., "Passive, precision direction finding", Aug. 1990, retrieved from <http://www.highbeam.com/doc/1G1-9323293.html>.*

Daimler-Benz Aerospace, "Multifunction 35 GHz FMCW radar with frequency scanning antenna for synthetic vision applications", 1995, retrieved from <http://scitation.aip.org/getpdf/servlet/GetPDFServlet?filetype=pdf&id=PSISDG002463000001000028000001&idtype=cvips&doi = 10.1117/12.212752&prog=normal>.*

* cited by examiner

SYSTEM FOR PROVIDING SPATIAL AWARENESS OF TRANSMISSIONS OF ENERGY IN AN ENVIRONMENT

BACKGROUND OF THE INVENTION

1. Field of the Invention

The present invention relates generally to sensing of physical phenomena in an environment, particularly to sensing RF sources in an environment, and more particularly to utilizing digital beamforming techniques to detect RF sources in an environment and visually providing spatial awareness of the location of the RF source.

2. Description of the Related Art

Military soldiers are called upon to execute a wide variety of missions. Some of the most dangerous missions involve engagement of enemy forces that place soldiers in harm's way. Providing superior information to soldiers is an important means of establishing a tactical advantage that can greatly increase the probability of survival of the soldier and successful execution of important missions. Enemy forces commonly utilize communication equipment ranging from consumer cell phones to sophisticated military radio transceivers. The ability to visually survey an environment to identify, locate and characterize RF sources can be beneficial in a variety of applications. For example, visually mapping the RF sources in an environment might reveal the presence and location of enemy forces that would otherwise remain concealed and potentially lethal.

Characterizing the RF environment at some location and time can be challenging. There may be many transmit sources of different frequencies and bandwidths received with different power levels. A spectrum analyzer can identify the presence of RF energy in a given band, but does not generally identify the location from which the energy arrived. A directional antenna used with a spectrum analyzer could help isolate an RF source, but may have other limitations, such as a fixed beamwidth, mechanical steering, and an inability to analyze multiple directions simultaneously.

U.S. Pat. No. 5,307,077, entitled "Multi-Spectral Seeker Antenna" issued to John T. Branigan et al, discloses a multi-spectral seeker system for detecting radiation in the infrared (IR) band and a plurality of radio frequency (RF) bands suitable for use in a guided missile is disclosed. The IR and RF seekers are coaxially integrated on a single gimbaled platform and share a common aperture without significant performance degradation. In the preferred embodiment, the IR seeker uses a Cassegrainian reflector assembly with surfaces reflective to IR but transparent to RF signals. The first RF seeker uses a resonant dichroic reflector antenna which is transparent to RF signals at frequencies no closer than 0.5 octaves from the dichroic reflector system operating frequency. The second RF seeker may use any suitable RF antenna system although a planar-array of multi-mode spiral antennas or a standard flat plate slotted array are preferred. The second RF seeker may operate in an active, semi-active, or passive mode. The IR seeker means and both RF seeker means together provide coaxial seeking in a single aperture covering three frequency bands without significant loss of performance in the RF antenna and IR sensor. The material on which the parabolic reflector is formed is tapered in thickness as a function of radius to eliminate phase delays introduced by the curvature as seen by the second RF seeker.

Branigan et al requires a high performance mechanically steered antenna structure, which is challenging to implement and may be physically large. As will be disclosed below, the present invention overcomes these limitations with electronic steering by way of digital beam forming.

SUMMARY OF THE INVENTION

In a broad aspect, the present invention is a system for providing RF spatial awareness of an environment. The system includes an RF detection system and a control system. The RF detection system includes an antenna array for receiving RF signals from a plurality of RF sources; and, a receiver system operatively connected to the antenna array using digital beamforming (DBF) techniques for processing the received RF signals and providing measurements of the RF signals as output. The control system receives the measurements of the RF signals and displays a plurality of indicia indicating the RF sources, thereby providing a visual survey of the environment.

The control system preferably includes a video-display processing unit operatively connected to the receiver system for receiving the measurements of the RF signals and controlling the receiver system with DBF commands. At least one video camera provides a video stream of an area of interest to the video-display processing unit. A pointing device accepts interactive user inputs to the video-display processing unit for operating the video-display processing unit. A display unit is operatively connected to the video-display processing unit for displaying a plurality of interactive commands and the video stream with the measurements. The measurements are displayed as a plurality of indicia indicating the RF sources, thereby providing a visual survey of the environment.

Although the present invention is particularly directed toward identification, location and characterization of RF sources in an environment, the concepts taught herein could be beneficially applied to other types of sources such as acoustical, radiation and the like.

The present invention could be used as a sensor for integration into an automatic red force tracking system, whereby enemy locations are determined and depicted on an electronic display to provide very valuable tactical battlefield information to soldiers in combat. The present invention could also be used as a sensor for an automatic blue force tracking system for tracking coalition forces that do not have integrated position reporting equipment to reduce or eliminate fratricide losses.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
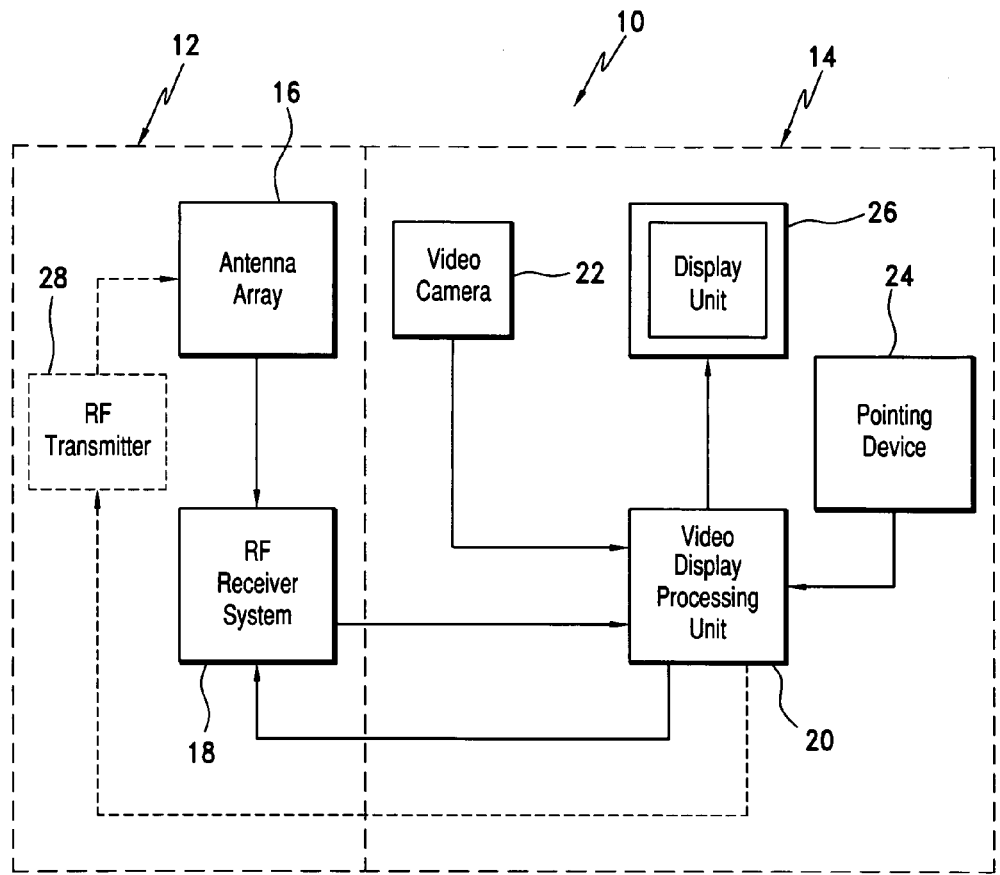
FIG. 1 is a schematic illustration of a system for providing RF spatial awareness in accordance of the principles of the present invention.

Referring now to the drawings and the characters of reference marked thereon, FIG. 1 is a schematic representation of a preferred embodiment of a system for providing RF spatial awareness, in accordance with the principles of the present invention, designated generally as 10. The system 10 includes an RF detection system 12 and a control system 14. The RF detection system 12 includes an antenna array 16 for receiving RF signals from multiple RF sources. An RF receiver system 18 is operatively connected to the antenna array 16 using digital beamforming (DBF) techniques for processing the received RF signals and providing measurements of the RF signals as output. The control system 14 operatively connected to the RF detection system 12 receives the measurements of the RF signals and displays indicia indicating the RF sources, thereby providing a visual survey of the environment.

The control system 14 includes a video-display processing unit 20 operatively connected to the RF receiver system 18 for receiving the measurements of the RF signals and controlling the RF receiver system 18 with DBF commands. At least one video camera 22 provides a video stream of an area of interest to the video-display processing unit 20. The video camera 22 may be zoomed in and out of the area of interest. A pointing device 24 accepts interactive user inputs to the video-display processing unit 20 for operating the video-display processing unit 20. A display unit 26 operatively connected to the video-display processing unit 20 displays multiple interactive commands and the video stream with the measurements. The measurements are displayed as indicia indicating the RF sources. The visual display unit 26 indicates RF source location, along with other desired signal information such as power level and frequency. This provides a unique 'RF Vision' capability with exceptional RF spatial awareness.

The RF signals received by the antenna array 16 are processed by the RF receiver 18 to measure the receive power for various directions of arrival (DOAs) in the array's field of view. The resulting power surface may be displayed on a grid or image, or processed to identify peaks in the surface to display the RF source location.

Figure 2:
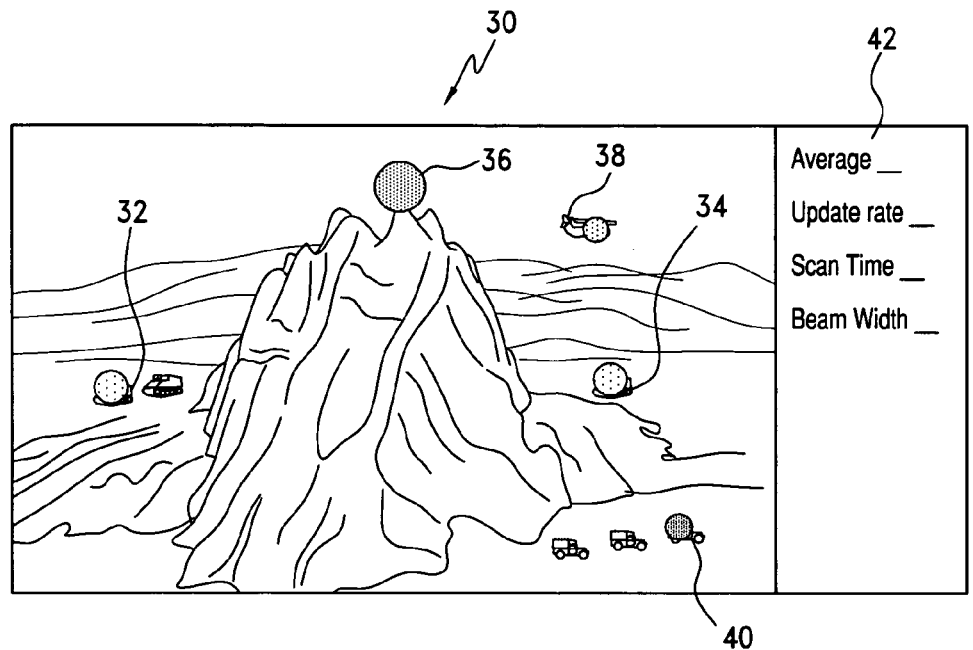
FIG. 2 is an illustration of a first embodiment of a display unit of a system of the present invention.

Referring now to FIG. 2, an example display is illustrated, generally designated as 30. The tanks 32 and 34 on either side of the hill communicate through a node 36 on the top of the hill on one frequency, and the helicopter 38 and the ground vehicle 40 communicate on another frequency. The indicia may include multiple dots in a grid or image for identifying peaks of the RF sources. The sizes of the dots indicate the relative powers of the RF sources and the colors of the dots identify the frequencies or bandwidths of the RF sources. The dots representing the tanks 32 and 34, and the helicopter 38 are light-shaded; and, the dots representing the node 36 and the ground vehicle 40 are dark-shaded. Since the power level of the node 36 is higher than the power level of the tanks 32 and 34, the size of dot representing the node 36 is bigger than the sizes of dots representing the tanks 32 and 34.

The interactive commands may include a popup window for displaying more information when the pointing device 26 is being hovered over one of the indicia. The popup window may also display options allowing a user to click them to conduct additional analysis. The interactive commands may include menus such as that denoted by numeral designation 42 allowing a variety of settings of the RF detection system 14 to be controlled. The settings may include averaging, update rates, scan times, bandwidths, etc. The interactive commands may include menus containing a list of signal signatures that can be targeted and the ability to save a time slice of an RF source for further analysis to determine other signal characteristics. The interactive commands may also include menus allowing the display unit 26 to zoom in and out of the field view of the antenna array 14, possibly coordinated with zoom in and out of the camera 22 for providing an image.

Referring again now to FIG. 1, in an optional configuration, the RF detection system 14 further includes an RF transmitting system 28 for transmitting RF signals to a field of view of the spatial environment. The RF transmitting system 28 is operatively connected to the antenna array 16 and to the control system 14. The RF signals are controlled by the control system 14 and transmitted through the antenna array 16. The RF transmitter system 28 is controlled by interactive commands including menu selections.

The RF transmitting system 28, when controlled with DBF techniques, may be used to wake up passive devices in a selected direction, or when transmitting a broad beam, may be used to wake up passive devices in the whole range of field view. The RF transmitting system 28 may also be used for searching RF receivers by transmitting a strong RF signal and listening for retransmissions from the RF receivers by utilizing the RF detection system 12.

Figure 3:
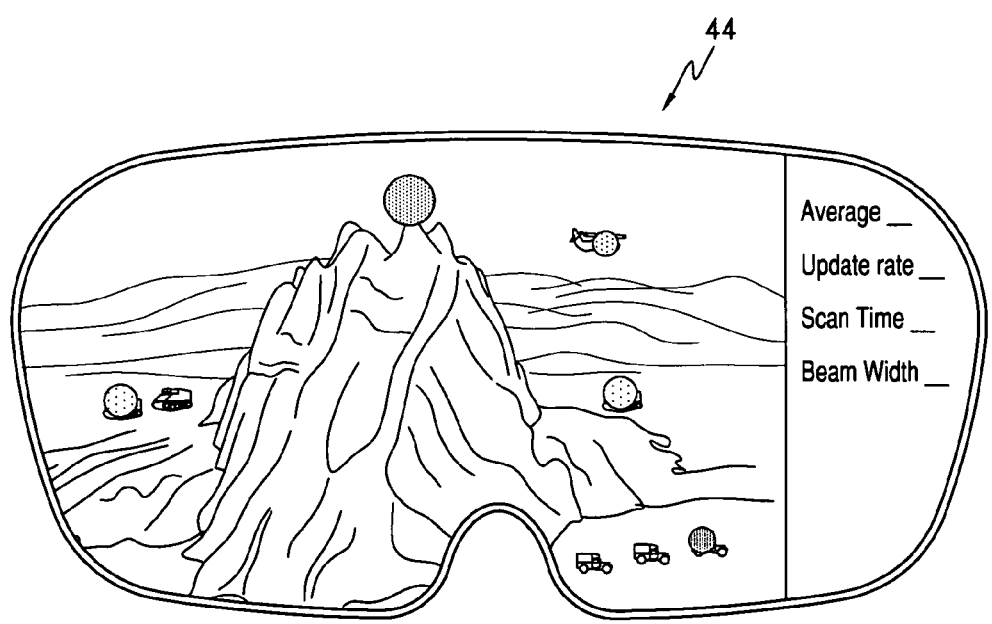
FIG. 3 illustrates the present invention implemented as a goggle to be worn by an individual.

The display unit 26 of the control system 18 may include a display surface. The indicia and video stream from the video camera 22 may be projected onto the display surface and take a portion of it. The implementation of the display unit 26 may be of a variety of configurations, such as a heads up display, a night-vision goggle or synthetic vision. The display may also be projected onto a visor, goggle, windshield, etc. In this case, there may be video in the display taking up a portion of the visor, or, if a sensing array were mounted such as a helmet, the actual image may be in view and video camera 22 would not be necessary. FIG. 3 shows implementation of the present invention on a goggle, designated generally as 44.

The various sub-systems of the system 10 may communicate with one another directly or remotely through a variety of means. They may communicate via wireless connection or via a wired network such as Ethernet. This allows sensing in one location and the display in another, or sensing in one, processing in another, and display at other locations. It may be possible to remote the system 10 and only stream back, for example, video and the analysis results. For example, a UAV having an array of sensors and video camera provides RF sensing, beamforming and video, consolidates it in a single video stream, and then streams both to a ground station over an RF link such as a Miniature Common Data Link (mini-CDL) for display. One ground station may control the system 10, but multiple ground stations could receive and display the information from the system 10. It is possible to allow each ground station some autonomy in filtering the information displayed, allowing them to concentrate on different signals. This can be used in training, to identify positions of all assets, or in combat or surveillance. For example, a High Mobility Multi-purpose Wheeled Vehicle (HMMWV) could have the bulk of processing with a foot unit having a heads up display (HUD). It may be used during search to track its own position or to see triggered RF alarms (booby traps).

Digital beamforming (DBF) techniques may be used to process signals received from an array of antennas. It is possible to measure signal characteristics, such as receive signal power, for a given direction. This information may be used to identify and display the RF source location, and associated information, for the array's field of view on a grid, video image, or a heads up display (HUD), night vision-type goggles or synthetic vision. Well known DBF techniques, such as constrained beamforming to point to one direction while placing nulls in other directions, may be used to isolate a signal for further analysis. The sources identified may be further analyzed to determine other signal characteristics, such as bandwidth and whether it is TDMA and/or frequency hopping and modulation type. Signals with specific signatures can be targeted and displayed, such as cell phone activity. Depending on the bandwidth of the elements of the antenna array 16, and the elements spacing, different frequencies may be targeted. The bandwidth at each frequency may be further divided, such as with a Fast Fourier Transform (FFT). Modulation recognition may be used along with other techniques to isolate a signal and even attempt to demodulate it.

It is possible to use other DBF techniques to isolate signals, such as nulling strong interferences, applying eigen-analysis based techniques, or using a minimal mean square error (MMSE) algorithm to provide interference cancellation to improve the signal-to-noise ratio (SNR) of the signal. Well known techniques such as successive cancellation may be used to search for RF sources hidden by stronger received signals.

DBF techniques offer a variety of options for 'scanning' of the field of view of the antenna array 16. A weight vector may be applied to the signals arriving from array elements to 'point' the antenna array 16 in a given direction. With digital processing, weight vectors may be used to focus the antenna array 16 in multiple directions simultaneously. The signals arriving from the array elements may be processed with enough weight vectors to cover the array's field of view. Alternatives to reduce processing requirements include sequentially scanning regions or storing a time-slice and operating on it for many directions.

There may be a fairly considerable amount of processing to scan a fine grid of DOAs. This can be reduced by starting with a scan of a somewhat sparse grid of DOAs for an initial coarse scan, followed by scanning a finer grid of DOAs where energy has been detected. This can provide peak location with better resolution while avoiding the need to scan a fine grid over the entire field of view of the array.

One option would be to vary the beamwidth of the array for coarse and fine scanning. Another is to vary the density of the DOA grid scanned. Even with a broad beam, a fairly accurate DOA can be determined for a single source, as the peak on the power surface can be determined on a DOA grid with arbitrary resolution. However, with multiple sources, the power contribution through sidelobes can affect the power peak, and a narrower beam and reduced sidelobes can improve the source location identification. The beamwidth of the array may be controlled, for example, by using subarrays and/or sidelobe reduction, to produce a wider beam that would have less gain.

Rather than exhaustively searching a fine grid to identify the DOA of a source more accurately, other means can be used to optimize the ideal DOA of the received power peak. For example, interpolation between results can be used, or an algorithm such as steepest descent may be used to converge to a power peak. Scanning does not have to use 'spot' beams. For example, with a planar array of patch antennas, it is possible to start with a vertical scan and/or horizontal scan, each with a beam shaped somewhat like an 'orange slice'.

Working with the RF receiver system 18 and the control system 14, the antenna array 16 of the system 10 may also be utilized to look for a known sequence with a given signature and determine its direction of arrival (DOA). For example, a certain frequency, bandwidth, and/or modulation can be targeted, and if detected, displayed. In this case, the antenna array 16 is not utilized to scan the field of view. 'Looking' for a known sequence may involve correlating against the known sequence, such as a unique ID. The phase relationship of the signal at the different elements of the antenna array 16 may be used to estimate the DOA. In this case, there would not have to be any scanning of a DOA grid to identify the position in this application. With this type of implementation, it may be possible to get a DOA estimate with very few elements—two elements for one dimensional location, e.g. azimuth; three or four for 2D location, e.g. azimuth and elevation. A basic example would be a signal on two elements with half wavelength horizontal separation; the phase difference (assuming a calibrated array) indicating an azimuth DOA. This application can have relatively low processing requirements that are suitable for portable devices.

The system 10 may also be used to search for RF IDs, and display the location of the IDs present. It may be possible to search for a class of assets such as soldiers in a unit, or an individual asset. 'Assets' tracked or located may be soldiers in a training exercise, units in a convoy, munitions during a military operation, or supplies misplaced in a storage facility. With the gain of the antenna array 16, digital beamforming capabilities, and judicious choice of waveform, an LPI/LPD signal may be located and displayed. Assets may be tracked in adverse conditions, such as snow, rain, fog, or dust.

When tracking assets, it may be possible for the assets to generate a timed response, for example, using a GPS clock or atomic-clock-on-a-chip. The receiver may then estimate range, which can be displayed along with the position information.

The system 10 may be passive, operating in a receive-only fashion, or part of a system with transmit capability. With transmit capability, the system 10 may operate similar to a passive RF ID system, where the asset has no power, or one that is battery powered and awakened by the system 10. It may work as a type of radar, or as a directional jammer to jam signals with certain characteristics in selected directions. For example, from viewing the display, it may look as if two units are communicating, since their power peaks appear and disappear roughly together. It may be possible to directionally jam one or both, while preserving the frequency for use in other directions. With a computer-based display, it may be possible to do this with some mouse clicks and menu selections, e.g. select directional jam, then click on the source locations.

It may be possible to use a transmitter, possibly a directional transmitter, to 'bang' the front end of transceivers or receivers in an attempt to listen for reradiated energy to identify the presence and location of non-cooperative devices such as receivers of improvised explosive devices (IEDs).

It is possible to coordinate multiple systems 10, for example, and use triangulation to determine RF source locations. This information can be used to estimate transmit power and provide a type of RF map of a region. It can also be fed to a cognitive radio network to help determine RF availability.

Even though a preferred embodiment of the present invention is implemented as a system for providing spatial awareness of an RF environment, it can be easily adapted into other systems for providing spatial awareness of a physical phenomenon in an environment. Such a system includes a physical phenomenon detection system and a control system. The physical phenomenon detection system includes an array of sensors for receiving physical phenomenon signals from a variety of physical phenomenon sources. A receiver system operatively connected to the array of sensors processes the received physical phenomenon signals and provides measurements of the physical phenomenon signals as output. The control system operatively connected to the physical phenomenon detection system receives the measurements of the physical phenomenon signals and displays indicia indicating the physical phenomenon sources, thereby providing a visual survey of the environment.

The system for providing spatial awareness of physical phenomenon in an environment further includes a transmitting system for transmitting physical phenomenon signals to a field of view of the array of sensors. The transmitting system is operatively connected an array of transmitting transducers and to the control system. The physical phenomenon signals are controlled by the control system and transmitted through the array of transmitting transducers.

Other embodiments and configurations may be devised without departing from the spirit of the invention and the scope of the appended claims.

The invention claimed is:

1. A system for providing RF spatial awareness of an environment, comprising:
   a) a passive RF detection system operational in a receive-only fashion, comprising:
      i) an antenna array for receiving RF signals originating from each of a plurality of RF sources; and,
      ii) a receiver system operatively connected to said antenna array using digital beamforming (DBF) techniques for processing said RF signals and providing measurements of said RF signals as output, wherein a scan pattern is variably controlled; and,
   b) a control system for receiving said measurements of said RF signals and displaying a plurality of indicia indicating said RF sources on a see through display, thereby providing a visualization of the otherwise invisible RF sources in the field of view,
      wherein said plurality of indicia convey information regarding the detected sources by their appearance and,
      wherein said control system allows selection of a subset of RF sources to display as said indicia and allows selection of a related display format.

2. The system of claim 1, wherein said control system, comprises:
   a) a see through display processing unit operatively connected to said receiver system for receiving said measurements of said RF signals and controlling said receiver system with DBF commands;
   b) a pointing device for accepting interactive user inputs to said see through display processing unit for operating said see through display processing unit; and,
   c) a see through display unit operatively connected to said see through display processing unit for displaying a plurality of interactive commands with said measurements, said measurements being displayed as a plurality of indicia indicating said RF sources, thereby providing a visualization of the otherwise invisible RF sources in the field of view.

3. The system of claim 2, wherein said control system comprises a plurality of interactive commands, including a popup window for displaying additional information when said pointing device is being hovered over one of said indicia.

4. The system of claim 2, wherein said plurality of interactive commands comprises a popup window for displaying options when said pointing device is being hovered over one of said indicia, said options allowing a user to select them to conduct additional analysis.

5. The system of claim 2, wherein said plurality of interactive commands comprises a plurality of menus allowing a variety of settings to be controlled, said variety of settings being of a group of settings comprising: averaging, update rates, scan times, and bandwidths.

6. The system of claim 2, wherein said plurality of interactive commands comprises a plurality of menus containing a list of signal signatures that can be targeted, and the ability to save a time slice of an RF source for further analysis.

7. The system of claim 2, wherein said RF detection system, said see through display processing unit, and said see through display unit are operatively connected via ethernet connection.

8. The system of claim 2, wherein said RF detection system scans said RF signals in a selected direction by applying a weight vector to combine said RF signals arriving from said antenna array to point said antenna array in said selected direction.

9. The system of claim 2, wherein said RF detection system scans said RF signals in multiple directions simultaneously by applying multiple weight vectors to combine said RF signals arriving from said antenna array to point said antenna array in said multiple directions.

10. The system of claim 2, wherein said RF detection system receives RF signals and correlates them against a known sequence to estimate direction of arrival (DOA) of said RF signals.

11. The system of claim 1, wherein said plurality of indicia comprises a plurality of dots in a grid for identifying peaks of said RF sources, the size of each of said dots for indicating relative power of said RF sources and the color of each said dots for identifying the frequency bandwidth of said RF sources.

12. The system of claim 1, wherein said DBF techniques comprise scanning a field of view of the antenna array utilizing weight vectors to focus the antenna array in multiple directions simultaneously.

13. The system of claim 1, wherein said control system comprises a see through display unit including a display surface having a sensing array mounted thereon, obviating the need for any video camera.

14. The system of claim 1, further comprising a see through display operatively connected to said control system.

15. The system of claim 1, wherein the scan pattern is variably controlled for coarse and fine scanning.

16. A method for providing RF spatial awareness of an environment, comprising the steps of:
   a) receiving RF signals originating from each of a plurality of RF sources using an antenna array operational in a receive-only fashion;
   b) processing said received RF signals utilizing a passive receiver system operatively connected to said antenna array using digital beamforming techniques and providing measurements of said RF signals as output, wherein a scan pattern is variably controlled; and,
   c) receiving said measurements of said RF signals and displaying a plurality of indicia indicating said RF sources on a see through display utilizing a control system, thereby providing a visualization of the otherwise invisible RF sources in the field of view,
      wherein said plurality of indicia convey information regarding the detected sources by their appearance and,
      wherein said control system allows selection of a subset of RF sources to display as said indicia and allows selection of a related display format.

17. The method of claim 16, wherein the step of receiving said measurements of said RF signals and displaying a plurality of indicia indicating said RF sources utilizing a control system, comprises the steps of:
   a) receiving said measurements of said RF signals and controlling said receiver system with DBF commands utilizing a video-display processing unit operatively connected to said receiver system;
   b) accepting interactive user inputs to said see through display processing unit for operating said see through display processing unit using a pointing device; and,
   c) displaying a plurality of interactive commands with said measurements using a display unit operatively connected to said see through display processing unit, said measurements being displayed as a plurality of indicia indicating said RF sources, thereby providing a visualization of the otherwise invisible RF sources in the field of view.

18. A system for providing RF spatial awareness of an environment, comprising:
- a) a passive RF detection system operational in a receive-only fashion, comprising:
  - i) an antenna array for receiving RF signals originating from each of a plurality of RF sources; and,
  - ii) a receiver system operatively connected to said antenna array using digital beamforming (DBF) techniques for processing said RF signals and providing measurements of said RF signals as output, wherein a scan pattern is variably controlled; and,
- b) a control system for receiving said measurements of said RF signals and displaying a plurality of indicia indicating said RF sources on a see through display, thereby providing visualization of the otherwise invisible RF sources in the field of view,
  - wherein said plurality of indicia comprises a plurality of dots in a grid for identifying peaks of said RF sources, the size of each of said dots for indicating relative power of said RF sources and the color of each said dots for identifying the frequency bandwidth of said RF sources,
  - wherein said control system comprises a see through display unit including a display surface having a sensing array mounted thereon on, obviating the need for any video camera and wherein said control system allows selection of a subset of RF sources to display as said indicia and allows selection of a related display format.

* * * * *